United States Patent [19]

Smith

[11] Patent Number: 5,080,956
[45] Date of Patent: Jan. 14, 1992

[54] OIL ABSORBENT MAT WITH SPILL CHANNELING MEANS

[76] Inventor: Linda K. B. Smith, 15135 Marl Dr., Linden, Mich. 48451

[21] Appl. No.: 280,944

[22] Filed: Dec. 7, 1988

[51] Int. Cl.$^5$ .............................................. B32B 3/00
[52] U.S. Cl. .................................. 428/166; 428/129; 428/284; 428/286; 428/190; 428/515
[58] Field of Search ............... 428/166, 129, 284, 286, 428/190, 515

[56] References Cited

U.S. PATENT DOCUMENTS

| | | | |
|---|---|---|---|
| 1,560,772 | 11/1925 | Flowler | 428/129 |
| 3,856,610 | 12/1974 | Bruneel | 428/138 X |
| 4,109,040 | 8/1978 | Ottaviano | 428/129 |
| 4,250,218 | 2/1981 | Tallon | 428/166 |
| 4,609,580 | 9/1986 | Rockett et al. | 428/198 |
| 4,684,562 | 8/1987 | Hartkemeyer | 428/182 |
| 4,798,754 | 1/1989 | Tomek | 428/74 |
| 4,814,219 | 3/1989 | Burgess | 428/113 |
| 4,822,669 | 4/1989 | Roga | 428/287 |
| 4,876,135 | 10/1989 | McIntosh | 428/76 X |
| 4,886,697 | 12/1989 | Perdelwitz, Jr. et al. | 428/288 X |

Primary Examiner—Patrick J. Ryan
Assistant Examiner—William P. Watkins, III
Attorney, Agent, or Firm—Weintraub, DuRoss & Brady

[57] ABSTRACT

The laminated mat of the present invention is suitable for protecting a surface from liquid spills. The mat includes a means for retaining the spills within the laminated mat; a means for channeling the spills throughout the laminated mat; and a means for absorbing the channeled spills. The retained means comprises a sheet of nonporous plastic material. The nonporous sheet is preferably a cushioning, bubble-pack of polyeyhelene and nylon. The channeling means is the bumpy bubble-pack surface. The absorbing means comprises an absorbent sheet, which absorbs the liquid spills that are retained on the nonporous sheet. The nonporous sheet is adhered to the absorbent sheet by a heat bonding process, whereby a polytube heat sealer seals the perimeter of the absorbent sheet to the nonporous sheet. The absorbent material may also be folded several times, and adhered to itself to form an absorbent roll. The absorbent roll is made from a flexible material which can be readily shaped to surround the base of leaky machinery to inhibit the flow of oil-based liquids therefrom.

10 Claims, 1 Drawing Sheet

U.S. Patent  Jan. 14, 1992  5,080,956
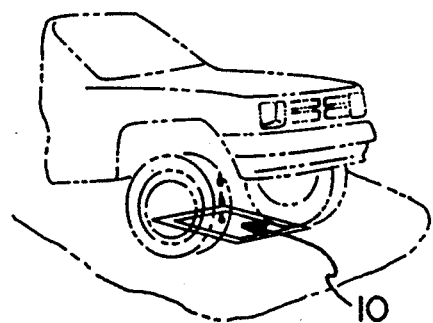
FIG 1
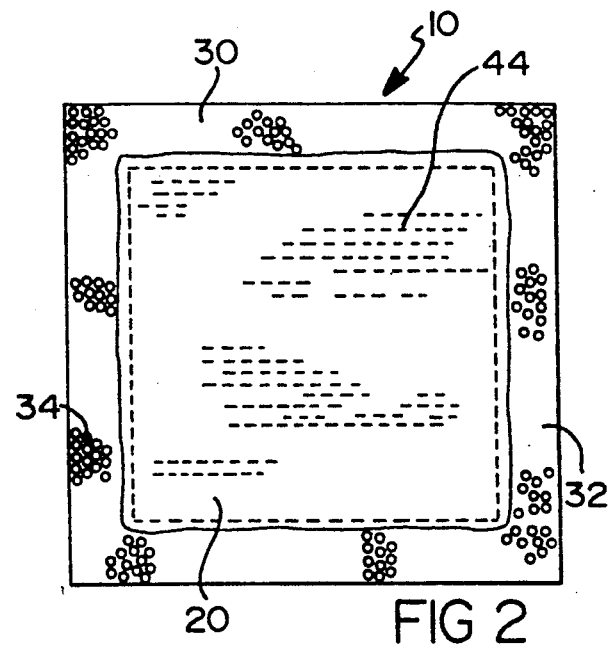
FIG 2
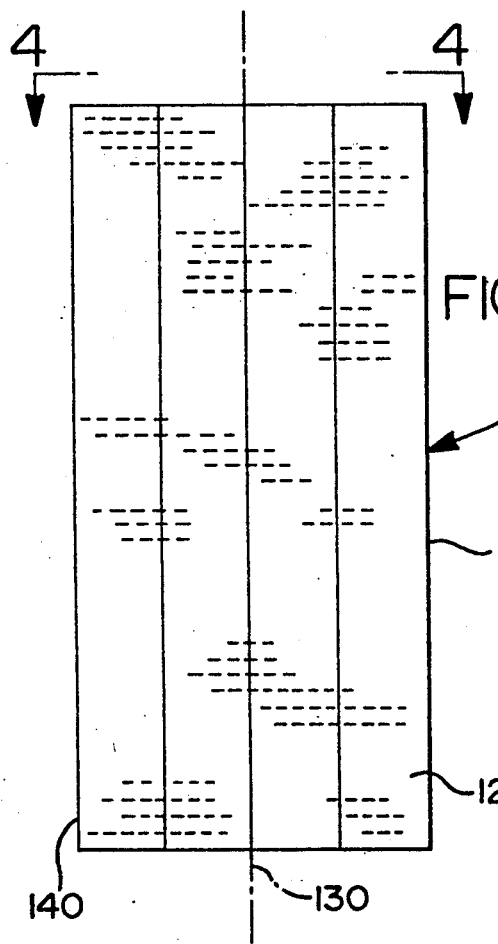
FIG 3
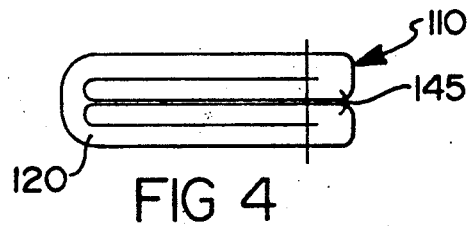
FIG 4
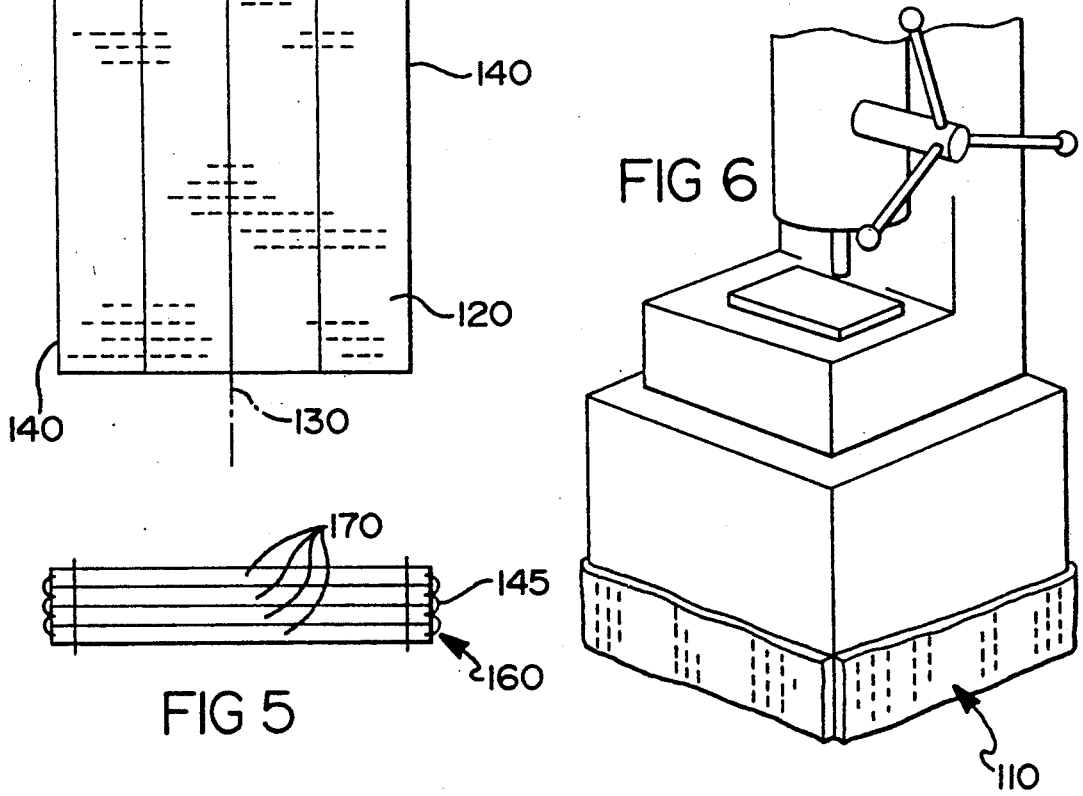
FIG 5
FIG 6

OIL ABSORBENT MAT WITH SPILL CHANNELING MEANS

BACKGROUND OF THE INVENTION

1. Field of the Invention

The present invention relates to an absorbent roll or laminated, and more particularly, to an absorbent roll or laminate that can be used to soak up oil spills, that occur around heavy machinery.

2. Background Art

Oil spills which occur in industrial and manufacturing environments are safety hazards and need to be effectively contained.

One remedy is to apply bulk quantities of particulate material directly to the spills. However, this approach results in replacing the oil puddles, with oil puddles containing bulk quantities of particulate material.

Another approach to this problem is an absorbent material that is commercially known as "Spill-Buster ®". This product consists of ground, classified corn cob fractions which are highly absorbent of oil, are biodegradable, and are non-toxic. The corn cob fractions are contained within a sealed, elongated sock-type fabric material. Each unit absorbs about three (3) pounds of oil/water in several minutes. Since the filler is a grain material, the material readily attracts rodents. This product is also difficult to dispose, and is flammable in storage.

Yet another solution to this problem is an absorbent material that is commercially available as the "Pig ™". This product is clay-based litter in a sock-like material. Each unit weighs about five pounds dry, making it difficult to handle and expensive to ship. Each unit absorbs about five (5) pounds of oil/water.

Similarly, oil spills that occur around and about vehicles during routine maintenance operations, cause a nuisance and need to be minimized or eliminated.

SUMMARY OF THE INVENTION

The present invention provides a laminated mat which is suitable for protecting a surface from liquid spills. The mat is lightweight, absorbent, and practical. The mat includes:

(a) means for retaining the spills within the laminated mat;

(b) means for channeling and distributing the spills throughout the laminated mat; and (c) means for absorbing the channeled and distributed spills The retaining means comprises a sheet of nonporous plastic material. The nonporous sheet is pretreated with soap and water to remove the static. The absorbing means is a highly absorbent sheet, such as fibrous olefin. The nonporous sheet is preferably a cushioning, bubble-pack of polyethelene and nylon. The bubble-pack material serves as the channeling means, distributing the liquid spills across the absorbent sheet. The absorbent sheet is capable of absorbing the liquid spills that are retained onto the nonporous sheet. The nonporous sheet is adhered to the absorbent sheet to form the laminated mat, preferably by a heat bonding process.

Another embodiment of the present invention is useful in containing oil-based liquids on factory floors. The roll material is inexpensive, lightweight, and highly absorbent to oil-based liquids. The absorbent roll is made from a flexible material which can be readily shaped to surround the base of leaky machinery to inhibit the flow of oil-based liquids therefrom. In another embodiment, the absorbent roll comprises a plurality of elongated, absorbent sheets. A plurality of rectangular sheets are adhered together along the longitudinal axes to form the absorbent roll.

For a more complete understanding of the oil absorbent roll and laminate of the present invention, reference is made to the following detailed description and accompanying drawings in which the presently preferred embodiments of the invention are depicted in several forms without departing from the spirit or essential characteristics thereof. It is expressly understood that the drawings are for purposes of illustration and description only, and are not intended as a definition of the limits of the invention.

Throughout the following description and drawings, identical reference numbers refer to the same component throughout the several views.

BRIEF DESCRIPTION OF THE DRAWINGS

FIG. 1 is a perspective view of the composite laminated mat, the mat being nonporous and absorbent, and the mat being disposed underneath a vehicle, and centered under an oil leak.

FIG. 2 is a simplified top elevational view of the composite laminated mat depicted in FIG. 1.

FIG. 3 is a simplified top elevational view of a sheet of absorbent material, having parallel fold lines along the longitudinal axis.

FIG. 4 is an end view of the absorbent material depicted in FIG. 3, the sheet being folded into an absorbent roll.

FIG. 5 is an end view of another embodiment of the absorbent roll, this roll being formed by a plurality of sheets adhered together along the edges thereof.

FIG. 6 depicts the absorbent roll of the present invention, disposed around a heavy-duty industrial machine.

DETAILED DESCRIPTION OF THE INVENTION

Referring now to the drawings, FIG. 1 and FIG. 2 depict one embodiment of the present invention, wherein an absorbent sheet 20 is combined with a nonporous sheet 30. The laminated mat 10 is suitable for protecting a surface from liquid spills. The mat 10 is shown disposed underneath a vehicle, and centered under an oil leak. The mat 10 includes: means for retaining 32 the spills on the laminated mat 10; means for channeling and distributing 34 the spills throughout the laminated mat; and means for absorbing 44 the spills.

The retaining means 32 preferably is a sheet of nonporous plastic material 30. The nonporous sheet 30 is pretreated with a soap and water solution to remove static electricity. The water serves to neutralize the static electricity, and the soap serves to bind temporarily the water to the nonporous sheet 30, thereby enabling the water retention. The soap and water solution consists of a squirt of "Joy ®", the conventional household dishwashing detergent liquid in a gallon of tap water.

The nonporous sheet 30 is preferably a cushioning, bubble-pack material, which serves to retain and channel the liquid spills onto the absorbent sheet 20. The nonsmooth bubble-pack material serves as the channeling and distributing means 34. The liquid spills tend to flow and surround the individual bubbles on the bubble-pack material, as the liquid tends to become evenly distributed across the surface of the nonporous sheet 30.

The nonporous sheet 30 is a combination of polyethylene and nylon, and is commercially available from the Sealed Air Corp. of Hodgkins, Illinois as anti-static "Polycap®", Catalog Number PC 220 AS.

The absorbing means 44 comprises an absorbent sheet 20, which is preferably a fibrous olefin. The absorbent sheet 20 is capable of absorbing the liquid spills that are retained onto the nonporous sheet 30. The absorbent sheet material is capable of absorbing at least 15 times or more its weight of petroleum products and hydrocarbon solvents within 60 seconds. Liquid spills may be readily removed and recovered simply by wringing the mat 10. The laminated mat 10 subsequently may be reused several times with minimal loss of absorbency.

The absorbent sheet 20 absorbs 10 to 20 times its weight of petroleum products and hydrocarbon solvents, depending upon the viscosity of the absorbed liquids. The absorbent sheet 20 is made of olefin fibers and is commerically available from Globe International Inc. of Buffalo, NY, and is designated as ALSORB II ®. One 18×18 inch sheet of ALSORB II ® will hold up to a quart of oil.

The laminated mat 10 is constructed of non-cling, and anti-static materials. It is preferred that the absorbent sheet 20 be non-cling so that it may be assembled from rolls, whereby the individual layers do not cling to each other. It is preferred that the materials be non-static since the mats are to be used primarily around vehicles. Since newer vehicles are equipped with an ever-increasing amount of circuitry, it is important to minimize the amount of static electricity that these vehicles are exposed to.

Preferably, the nonporous sheet 30 is adhered to the absorbent sheet 20 to form the laminated mat 10. The sheets are preferably adhered together by a heat bonding process. Other adhering means include chemical binding agents, adhesives and stitching the sheets together. The sealer is an impulse bag sealer, of a kind which is generally available and is well known to those skilled in the art. The polytube heat sealer will heat bond the plastic absorbent sheet 20 to the plastic nonporous sheet 30 about the perimeter of the absorbent sheet 30.

Another embodiment of the present invention is depicted in FIG. 3, where an elongated absorbent sheet forms an absorbent roll 110. The roll 110 is made from a flexible material which can be readily shaped to surround the base of leaky machinery to inhibit the flow of oil-based liquids therefrom (see FIG. 6). The absorbent roll 110 comprises an elongated, absorbent sheet 120, that is essentially rectangular in shape, the sheet 120 having a longitudinal axis 130. The two longer edges 140 of the sheet are essentially parallel to the longitudinal axis. The sheet 120 includes a plurality of folds 150 which are parallel to the longitudinal axis 130. The multiply folded sheet is adhered together along the longitudinal axis as depicted in FIG. 4, to form the absorbent roll 110. The roll 110 is preferably adhered together 145 by a standard cartridge-loaded tag stapler.

Preferably, the longitudinal edges 140 of the sheet are folded in such a manner as to be in close proximity to each other along the respective lengths thereof. The edges 140 are adhered together inwardly to prevent fraying thereof. Two of the folded edges 140 are adhered together and sealed to retain excess fluids therein. The roll 110 preferably has three folds as shown in FIG. 4.

Another embodiment of the absorbent roll 160 is depicted in FIG. 5. The absorbent roll 160 comprises a plurality of elongated, absorbent sheets 170. Each sheet 170 is essentially rectangular in shape (similar in shape to one elongated quarter of the sheet shown in FIG. 3), having a longitudinal axis, and two edges which are essentially parallel to to the longitudinal axis. The sheets 170 are adhered together along the longitudinal axes to form the absorbent roll 160. Preferably, in this embodiment the sheets 170 are adhered together 145 along a plurality of positions along the edges of the sheets, so liquids may be retained within the absorbent roll.

In either embodiment of the absorbent roll 110 or 160, the absorbent sheet is preferably made of plastic absorbent material, such as fibrous olefin. The absorbent sheet material is capable of absorbing at least 15 times its weight of petroleum products and hydrocarbon solvents, within 60 seconds. The absorbent sheet absorbs 10 to 20 times its weight of petroleum products and hydrocarbon solvents, depending upon the viscosity of the oil. The absorbent sheet is made of olefin fibers and is commercially available from Globe International Inc. of Buffalo, NY, and is designated as ALSORB II ®. Liquids may be readily removed and recovered simply by wringing the roll. The absorbent roll subsequently may be reused several times with minimal loss of absorbency. The roll material is inflammable.

An 18" roll of the ALSORB II ® requires the same storage area as 40 pounds of granular absorbent. Yet, the roll absorbs up to 225 pounds more oil, covers four times more floor area than a 0.267 inch layer of clay, and weighs only 13.25 pounds.

While the oil absorbent laminated, and roll of the present invention has been described in conjunction with specific embodiments, it is evident that many other alternatives, modifications, and variations will be apparent to those skilled in the art in light of the disclosure herein. It is intended that the metes and bounds of the invention be determined by the appended claims rather than by the language of the above specification, and that all such alternatives, modifications, and variations which form a functional or conjointly cooperative equivalent are intended to be included within the spirit and scope of these claims.

I claim:

1. A laminated mat suitable for protecting a surface from liquid spills, comprising:
   (a) means for retaining the spills within the laminated mat, thereby substantially preventing the spills from penetrating the mat and contacting the surface;
   (b) means for channeling and distributing the spills to the means for retaining;
   the means for channeling having a perimeter with an outer edge and comprising a top portion thereof which comprises bubbles extending above the retaining means;
   (c) means for absorbing the channeled and distributed spills within the laminated mat, the absorbing means being disposed inside the perimeter of the channeling means at a distance from the outer edge thereof;

2. The laminated mat of claim 1, wherein the retaining means comprises a sheet of nonporous plastic material.

3. The laminated mat of claim 1, wherein the channeling and distributing means comprises a cushioning, bubble-pack material.

4. The laminated mat of claim 1, wherein the absorbing means comprises a sheet of plastic absorbent material, the absorbent sheet being capable of absorbing the liquid spills that are retained by the retaining means.

5. The laminated mat of claim 2, wherein the mat is composed of non-static, non-cling materials.

6. The laminated mat of claim 2, wherein the nonporous sheet is pretreated with soap and water, to remove any static electricity therefrom.

7. The laminated mat of claim 1, further comprising means for adhering the absorbing means to the retaining means.

8. The laminated mat of claim 3, wherein the absorbent sheet consists essentially of fibrous olefin, which is capable of absorbing at least 15 times its weight of petroleum products and hydrocarbon solvents within 60 seconds.

9. The laminated mat of claim 1, wherein the liquid spills may be removed and recovered from the mat by wringing the mat, and the mat is reusable after the liquid spills have been removed therefrom.

10. The laminated mat of claim 7, wherein the adhering means is a heat bonding process which is applied by an impulse bag heat sealer around the perimeter of the absorbent sheet.

* * * * *